(12) United States Patent
Valsesia et al.

(10) Patent No.: US 10,515,112 B2
(45) Date of Patent: Dec. 24, 2019

(54) METHOD AND DEVICE FOR SEARCHING IMAGES

(71) Applicant: POLITECNICO DI TORINO, Turin (IT)

(72) Inventors: Diego Valsesia, Borgomanero (IT); Giulio Coluccia, Grugliasco (IT); Tiziano Bianchi, Prato (IT); Enrico Magli, Turin (IT)

(73) Assignee: POLITECNICO DI TORINO, Turin (IT)

( * ) Notice: Subject to any disclaimer, the term of this patent is extended or adjusted under 35 U.S.C. 154(b) by 146 days.

(21) Appl. No.: 15/575,234

(22) PCT Filed: Jun. 20, 2016

(86) PCT No.: PCT/IB2016/053656
§ 371 (c)(1),
(2) Date: Nov. 17, 2017

(87) PCT Pub. No.: WO2016/207774
PCT Pub. Date: Dec. 29, 2016

(65) Prior Publication Data
US 2018/0157680 A1  Jun. 7, 2018

(30) Foreign Application Priority Data

Jun. 23, 2015  (IT) .................... 102015000026649

(51) Int. Cl.
*G06K 9/00* (2006.01)
*G06K 9/62* (2006.01)
(Continued)

(52) U.S. Cl.
CPC .......... *G06F 16/5838* (2019.01); *G06F 16/51* (2019.01); *G06F 16/583* (2019.01);
(Continued)

(58) Field of Classification Search
CPC ............ G06K 9/00577; G06K 9/6215; G06K 9/6251; G06K 9/6252
(Continued)

(56) References Cited

U.S. PATENT DOCUMENTS

| 8,731,236 B2 * | 5/2014 | Li ...................... G06K 9/00744 283/113 |
| 2005/0152606 A1 * | 7/2005 | Wood ................. G06K 9/00067 382/232 |

(Continued)

FOREIGN PATENT DOCUMENTS

| GB | 2486987 A | 7/2012 | |
| WO | WO-2016012915 A1 * | 1/2016 | ......... G06K 9/00577 |

OTHER PUBLICATIONS

Diego Valsesia et al., *Compressed Fingerprint Matching and Camera Identification via Random Projections*, IEEE Transactions on Information Forensics and Security, vol. 10, No. 7, Jul. 2015, pp. 1472-1485.

(Continued)

*Primary Examiner* — Dwayne D Bost
*Assistant Examiner* — Stephen M Brinich
(74) *Attorney, Agent, or Firm* — Workman Nydegger (57) ABSTRACT

A method and a device for searching for images in memory containing at least one or more images and, for each image, at least one sensor fingerprint associated with the image and related to the sensor that acquired the image includes a reading phase, wherein a search sensor fingerprint is read, a compression phase, wherein the search sensor fingerprint and at least one of the sensor fingerprints associated with the images are compressed by using a random projection technique, and a searching phase, wherein the images contained (Continued)

in the memory are either selected or discarded by comparing the sensor fingerprints of the images with the search sensor fingerprint.

35 Claims, 3 Drawing Sheets

(51) Int. Cl.
    *G06F 16/583* (2019.01)
    *G06F 16/51* (2019.01)
(52) U.S. Cl.
    CPC ....... *G06K 9/00577* (2013.01); *G06K 9/6202* (2013.01); *G06K 9/6203* (2013.01); *G06K 9/6215* (2013.01); *G06K 9/6251* (2013.01); *G06K 2009/00583* (2013.01)
(58) Field of Classification Search
    USPC ................. 382/217–222, 115–127; 358/3.28
    See application file for complete search history.

(56) References Cited

U.S. PATENT DOCUMENTS

| | | | |
|---|---|---|---|
| 2009/0022374 A1* | 1/2009 | Boult | ................. G06K 9/00885 382/119 |
| 2009/0257671 A1 | 10/2009 | Fridrich et al. | |
| 2012/0195476 A1 | 8/2012 | Bayram et al. | |

OTHER PUBLICATIONS

Diego Valsesia et al., *IEEE Xplore Abstract—Compressed Fingerprint Matching and Camera Identification via Random Projections*, Feb. 25, 2016, pp. 2, XP055253097, http://ieexplore.ieee.org/xpls/abs_all.jsp?arnumber=7065259&tag=1.

Diego Valsesia et al., *Scale-Robust Compressive Camera Fingerprint Matching with Random Projections*, 2016 IEEE International Conference on Acoustics, Speech and signal Processing (ICASSP), Apr. 24, 2015, pp. 1697-1701, XP055253092.

International Search Report and Written Opinion dated Sep. 28, 2016, issued in PCT Application No. PCT/IB2016/053656, filed Jun. 20, 2016.

* cited by examiner

METHOD AND DEVICE FOR SEARCHING IMAGES

BACKGROUND OF INVENTION

1. Field of Invention

The present invention relates to a method and a device for searching for images, in particular for searching for images in memory means by using fingerprints of sensors that acquired said images.

2. The Relevant Technology

As is known, imperfections of image sensors can be considered as unique fingerprints that identify a specific acquisition device, thus being useful for several important forensic activities, such as identification of devices, connection of devices, recovery of the processing history and detection of digital counterfeits, as illustrated in document by J. Fridrich, "Digital image forensics", 2009. The most common camera fingerprint is the PRNU ("Photo-Response Non-Uniformity") of the digital image sensor (see also J. Lukas, J. Fridrich and M. Goljan, "Determining digital image origin using sensor imperfections", in Proc. SPIE Electronic Imaging, Image and Video Communication and Processing, vol. 5685, 2005, pp. 249-260). The PRNU of image sensors is a unique property of each array of a sensor, since it is determined by the different capability of every single optical sensor to convert photons into electrons. This difference is caused mainly by impurities in the silicon wafers used for manufacturing the sensors, and its effect is a particular noise pattern affecting every image acquired by a specific sensor. It follows that the PRNU can be considered as a broadband digital fingerprint of the sensor used for acquiring a given image or set of images. The PRNU is multiplicative, which means that, if an image sensor is ideally illuminated with a uniform intensity i, without considering other sources of noise, the output of the sensor will be $o = i + i \cdot k$, where k represents the matrix that characterized the PRNU values and $i \cdot k$ denotes the elementwise product of i and k. It must be pointed out that the term k has the following properties:

- it has the same pixel size as the sensor;
- it univocally identifies a particular sensor, e.g., each optical sensor has one and only one PRNU;
- it is present in every image acquired by a particular sensor, except those that are completely dark (due to its multiplicative nature);
- it is stable in different environmental conditions (e.g., different temperature/humidity, different camera battery charge levels, etc.);
- it is robust to various signal processing operations.

This nature of the PRNU makes it particularly interesting for searching any data bank (e.g., a data bank accessible through the Internet, such as Flickr, Instagram or the like) for photographs acquired by a particular sensor, i.e., a particular device (camera, smartphone, or the like).

However, this application poses some technical difficulties because, in the case of the PRNU, the digital fingerprint of a sensor is essentially a pattern of the same size as the sensor, which, according to the current state of the art, amounts to tens of millions of pixels. Therefore, a realistic database of thousands of sensor fingerprints associated with respective photographs would require a storage capacity in excess of 1010 single pixel values in uncompressed format.

Such big dimensions would also make it very difficult to find a particular digital fingerprint in a large database, typically requiring the computation of an index of correlation between each digital fingerprint in the database and the fingerprint to be searched for. This would imply a particularly high computational load per search, thus limiting the number of images that can be searched for per time unit.

Several authors have recently started tackling the problems relating to the management of a large database of digital camera fingerprints.

In the documents by M. Goljan, J. Fridrich and T. Filler, "Managing a large database of camera fingerprints", 2010 and Y. Hu, B. Yu and C. Jian, "Source camera identification using large components of sensor pattern noise", 2009, the authors propose a so-called "selection" of digital fingerprints, which operates by keeping only a fixed number of the largest digital fingerprint values and of the positions thereof, so that the database will be independent of sensor resolution.

An improved search based on a selection of digital fingerprints has been proposed in the document by Y. Hu, C.-T. Li, Z. Lai and S. Zhang, "Fast camera fingerprint search algorithm for source camera identification", 2012.

These proposed solutions do not ensure, however, that during the process of reducing the size of the sensor fingerprint a sufficiently large amount of information will be preserved in comparison with the one originally contained in the original fingerprint.

An alternative solution for attaining reduced time complexity is to represent the sensor fingerprints in quantized binary form, as shown in S. Bayram, H. Sencar and N. Memon, "Efficient sensor fingerprint matching through fingerprint binarization", 2012: even though the dimensions of binary digital fingerprints depend on sensor resolution, binarization can considerably speed up the digital fingerprint matching process. In this case as well, however, there is no guarantee that the amount of information contained in the processed fingerprint will be sufficiently high, compared to the one originally contained in the original fingerprint.

None of the above-mentioned documents indicates how to significantly reduce the size of the database of digital camera fingerprints while at the same time preserving the efficacy of digital fingerprint matching processes allowing identification of images acquired by a particular sensor.

As a matter of fact, compression of the sensor fingerprints through a lossless technique (e.g., LZW or the like) would lead to a smaller fingerprint database, but would also imply a higher computational cost (i.e., increased time complexity), because a significant comparison between two fingerprints could only be made after decompressing them, resulting in wasted computational time.

SUMMARY OF THE INVENTION

The present invention aims at solving these and other problems by providing a method for searching for images as set out in the appended claims.

In addition, the present invention aims at solving these and other problems by providing a device for searching for images as set out in the appended claims.

The basic idea of the present invention is to compress sensor fingerprints by using a random projection technique (a particular case of Johnson-Lindenstrauss projections).

This solution allows preserving, in the compressed fingerprints, the distances between the points of the original fingerprint, so as to save as much information as possible. In this manner, two fingerprints can be compared in a significant manner (e.g., by computing an index of correlation)

without requiring decompression, thus reducing the complexity in space (the fingerprints are always treated in compressed form) and in time (the amount of processed data is smaller, resulting in less operations to be carried out).

Further advantageous features of the present invention will be set out in the appended claims.

BRIEF DESCRIPTION OF THE DRAWINGS

These features as well as further advantages of the present invention will become more apparent from the following description of an embodiment thereof as shown in the annexed drawings, which are supplied by way of non-limiting example, wherein.

DETAILED DESCRIPTION OF THE PREFERRED EMBODIMENTS

Any reference to "an embodiment" in this description will indicate that a particular configuration, structure or feature is comprised in at least one embodiment of the invention. Therefore, the phrase "in an embodiment" and other similar phrases, which may be present in different parts of this description, will not necessarily be all related to the same embodiment. Furthermore, any particular configuration, structure or feature may be combined in one or more embodiments in any way deemed appropriate. The references below are therefore used only for simplicity's sake and do not limit the protection scope or extent of the various embodiments.

Figure 1:
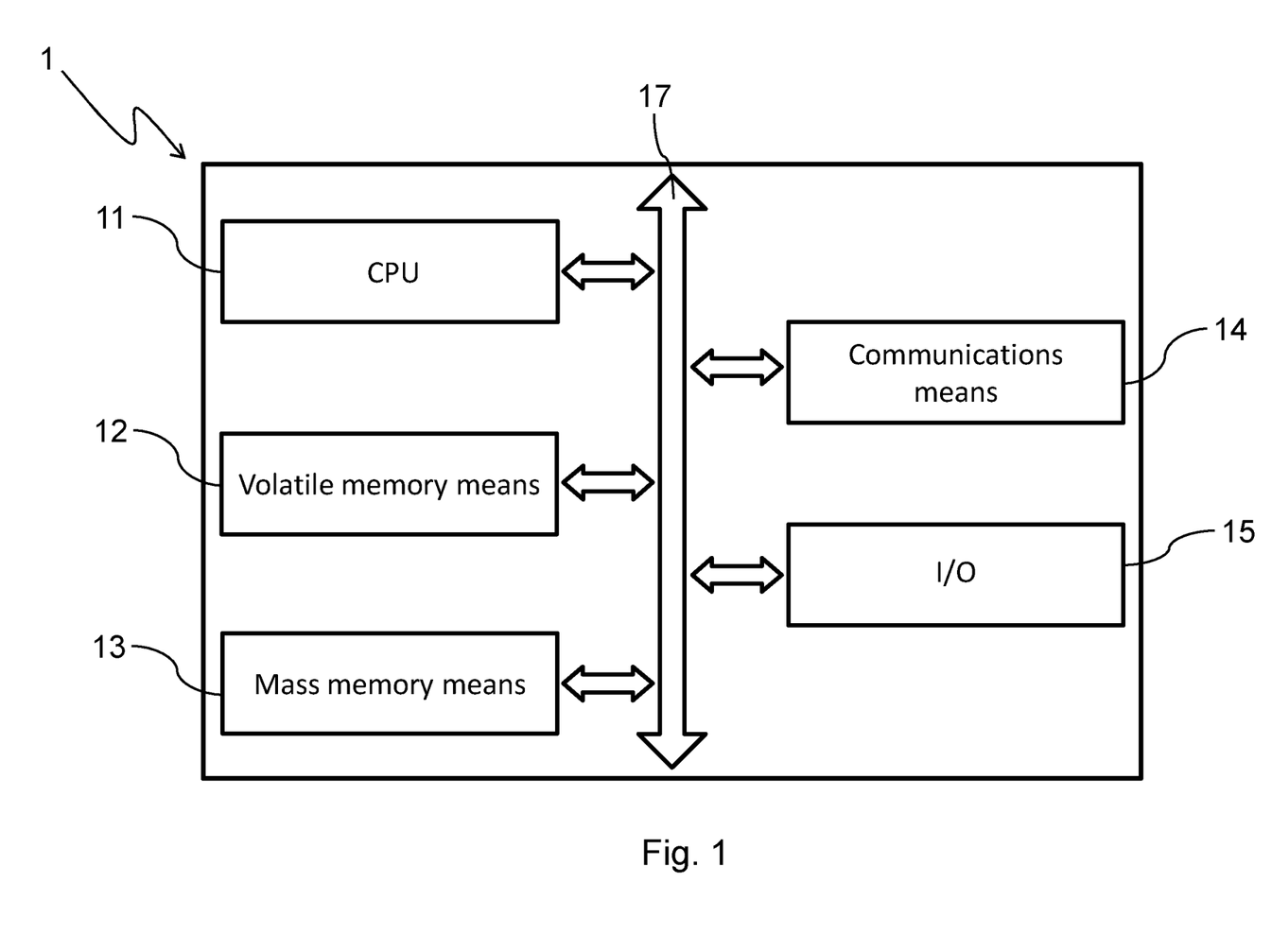
FIG. 1 shows a block diagram of a device for searching for images according to the invention.

With reference to FIG. 1, an embodiment of the device 1 according to the invention comprises the following components:

control and processing means 11, e.g., one or more CPUs, governing the operation of the device 1, preferably in a programmable manner, through the execution of suitable instructions;

volatile memory means 12, e.g., a random access memory RAM, in signal communication with the control and processing means 11, wherein said volatile memory means 12 store at least instructions that can be read by the control and processing means 11 when the device 1 is in an operating condition;

mass memory means 13, preferably one or more magnetic disks (hard disks) or a Flash memory or the like, in signal communication with the control and processing means 11 and with the volatile memory means 12, wherein said memory means 13 store at least one or more images and/or references to said images (e.g., pointers, URL universal addresses, or the like) and, for each image and/or reference thereof, at least one sensor fingerprint associated with said image and/or with said reference and related to the sensor that acquired said image;

communication means 14, preferably a network interface operating in accordance with a standard of the IEEE 803.2 (also known as Ethernet) or 802.11 (also known as WiFi) or 802.16 (also known as WiMax) families or an interface for a GSM/GPRS/UMTS/LTE or TETRA data network, which allow the device 1 to communicate with other devices through a data network, the latter devices being further described below);

input/output (I/O) means 15, which may be used, for example, for connecting said device 1 to peripherals (e.g., one or more interfaces allowing access to other mass memory means, so as to preferably allow copying information from the latter to the mass memory means 13) or to a programming terminal configured for writing instructions (which the control and processing means 12 will have to execute) into the memory means 12; such input/output means 14 may comprise, for example, a USB, Firewire, RS232, IEEE 1284 adapter or the like;

a communication bus 17 allowing information to be exchanged among the control and processing means 11, the volatile memory means 12, the mass memory means 13, the communication means 14, and the input/output means 15.

As an alternative to the communication bus 17, the control and processing means 11, the volatile memory means 12, the mass memory means 13, the field communication means 14, the network communication means 15, and the input/output means 16 may be connected by means of a star architecture.

It must be pointed out right away that the mass memory means 13 may be replaced with remote mass memory means (e.g., a Storage Area Network—SAN), not comprised in said device 1; for such a purpose, the input/output (I/O) means 15 may comprise one or more mass memory access interfaces, such as, for example FC (Fibre Channel) and/or iSCSI (Internet SCSI), so that the device 1 can be configured for having access to said remote mass memory means.

Figure 2:
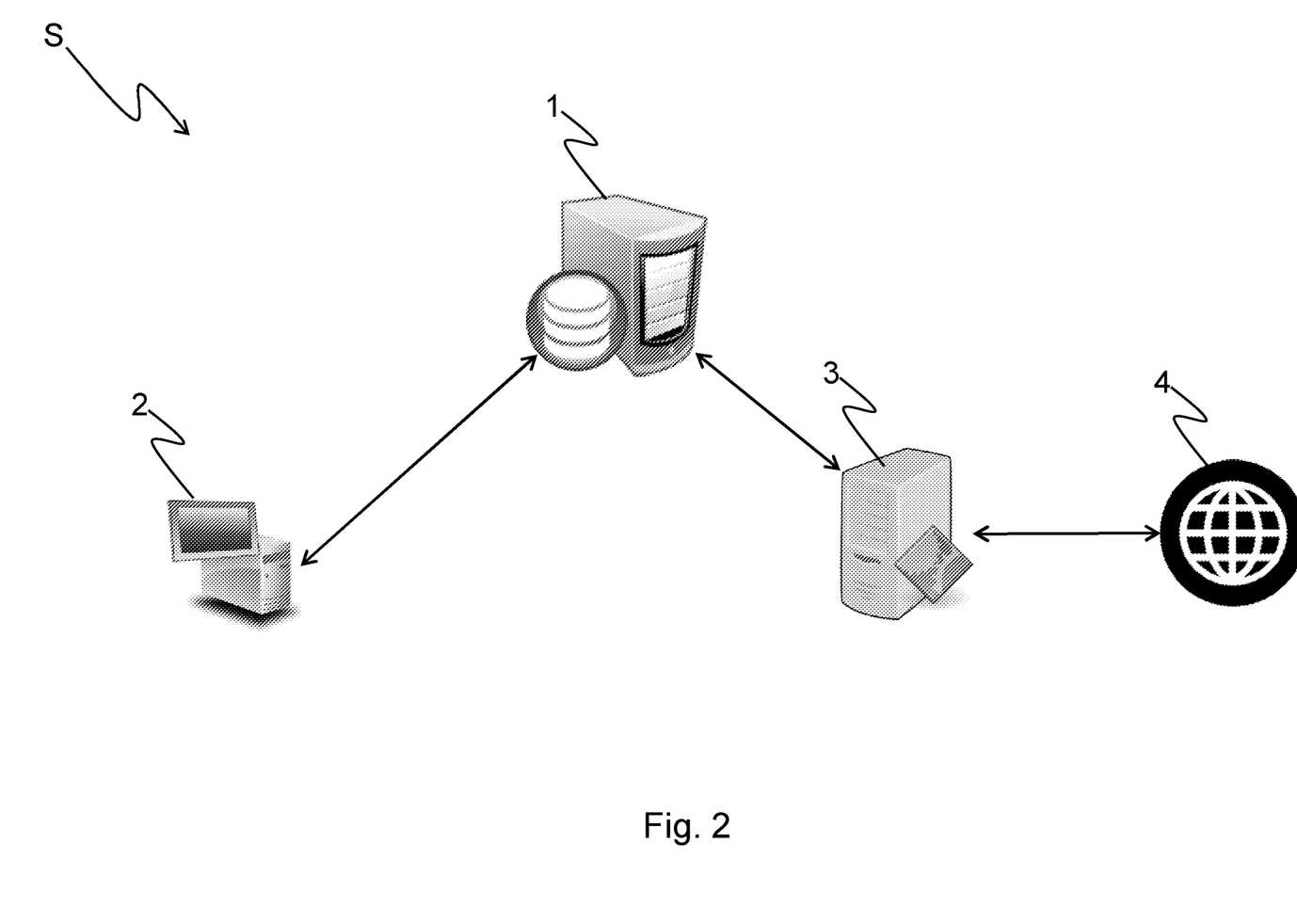
FIG. 2 shows a system comprising the device of FIG. 1.

Also with reference to FIG. 2, the following will describe a usage scenario which is typical of the device 1, wherein an image searching system S comprises the device 1, at least one client access terminal 2 (also referred to as client), and a data acquisition device 3.

The device 1 may consist of one or more servers appropriately configured for forming a cluster, and is preferably configured for receiving, preferably from the client access terminal 2, at least one query that comprises at least one search sensor fingerprint related to a sensor, the images acquired by which are to be searched for. In fact, as will be further described in this description, the device 1 is configured for searching for all images (or references thereto) contained in the volatile memory means 12 or in the (local or remote) mass memory means 13 accessible to the device 1 and acquired by a sensor having a fingerprint as similar as possible to the search sensor fingerprint specified in the query. To this end, at least one sensor fingerprint is associated with each image stored in the memory means 12,13, which sensor fingerprint will be further described below; this information is organized into a suitable data structure that allows effective data management (i.e., adding, editing or deleting data), such as, for example, a relational or object-based DataBase Management System (DBMS), the instructions of which are executed by the device 1 or by another device.

The terminal 2 may alternatively consist of a personal computer, a laptop, a smartphone or another electronic device allowing the formulation of queries comprising sensor fingerprints.

The device 1 may be configured for receiving said query via the communication means 14, so that the terminal 2 can transmit the query to the device 1 over a data network (e.g., an Ethernet-based private network and/or a public network such as the Internet). For this purpose, the device 1 may preferably be configured for executing instructions implementing web server functionalities, so as to allow the preferable formulation of queries via one or more HTML pages, through which it will be possible to load one or more search sensor fingerprints to be used for searching for images.

It must be pointed out that the device 1 and the terminal 2 may coincide into a single entity, i.e., the user may also make queries directly on the device 1.

The data acquisition device 3 is configured for updating the data bank information, i.e., for executing instructions causing it to take the following actions:

- exploring an image archive (e.g., Flickr, Instagram, Facebook or the like), a set of web sites or the like, and finding the images contained therein;
- generating, for each image found, a sensor fingerprint, if not yet present in the memory means accessible to the device 1, and possibly compressing the generated sensor fingerprint, as will be described more in detail below;
- storing, preferably in an incremental/differential manner (i.e., only those images or references thereto that are not yet present in said memory means), the images found and the compressed sensor fingerprints associated therewith into the memory means accessible to the device 1.

It must also be pointed out that the device 1 and the data acquisition device 3 may coincide into a single entity, i.e., the device 1 will take care of updating the memory means by entering new images (and the sensor fingerprints thereof) as soon as they are made available to it by whatever means, e.g., by a web exploring process (crawler).

Figure 3:
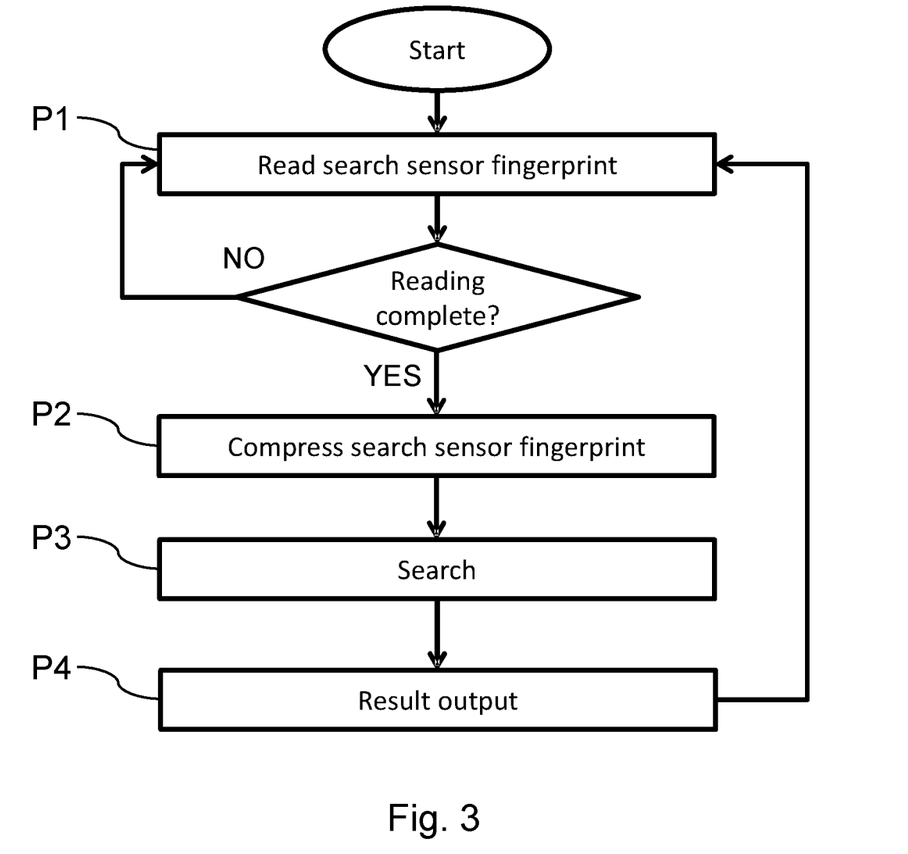
FIG. 3 is a flow chart that illustrates the method according to the invention.

Also with reference to FIG. 3, the following will describe the method for searching for images according to the invention, which is preferably carried out by the device 1 when it is in an operating condition. The method comprises the following phases:

- a fingerprint reading phase P1, wherein a search sensor fingerprint is read, which is preferably comprised in a query preferably contained in a request message received by the device 2 through the communication means 14, wherein said request message is preferably generated by the terminal 2 following interaction with a user of said terminal 2 or upon autonomous execution of a sequence of instructions by said terminal 2;
- a fingerprint compression phase P2, wherein the fingerprint read during the previous phase P1 is compressed by the processing and control means 11 of the device 1 by using the random projection technique that will be further described below;
- a searching phase P3, wherein the fingerprint compressed in phase P2 is compared, through the processing and control means 11, with at least one of the compressed fingerprints stored in the memory means 12,13 accessible to the device 1, and wherein an image (or reference thereto) is either selected or discarded on the basis of an index of correlation computed between said compressed search sensor fingerprint and one of the compressed sensor fingerprints associated with the images (or references thereto), e.g., if the comparison between at least one portion of the search sensor fingerprint and at least one portion of the fingerprint associated with the image being evaluated exceeds a threshold value, said image will be selected, otherwise it will be discarded;
- a result output phase P4, wherein any images (or references thereto) selected by the device 1 during phase P3 are preferably incorporated into one or more reply messages and sent to the sender of the request message (e.g., the terminal 2, or a process running in the device 1, or the like).

When the device 1 is in an operating condition, the processing and control means 11 may cyclically execute the phases P1-P4 in a sequential manner.

As an alternative to the above, the device 1 may be configured for executing the phases in a manner that is not strictly sequential, i.e., phase P3 may begin when phase P2 has not yet been completed, and phase P4 may begin when phase P2 and/or phase P3 have not yet been completed.

As aforementioned, this method compresses the digital fingerprints contained in the memory means 12,13 and the search fingerprint with very little or, ideally, no information loss. More in particular, the method is based on the Random Projection (RP) technique, which is a powerful and simple method of dimensional reduction. The basic idea of the RP technique is to project the original n-dimensional data onto an m-dimensional subspace, with m<n, by using a random matrix $\Phi \in \mathbb{R}$ m×n. As a result, a collection of N n-dimensional data $D \in \mathbb{R}$ n×N is reduced to an m-dimensional subspace $A \in \mathbb{R}^{m \times N}$ according to the following formula:

$$A = \Phi D \quad (1)$$

The underlying key property of the RP technique is the Johnson-Lindenstrauss lemma (which is considered to be an integral part of this description), which relates to low-distortion embeddings of points from high-dimensional into low-dimensional Euclidean space. The lemma states that a small set of points in a high-dimensional space can be embedded into a space of much lower dimension in such a way that the distances between the points are (nearly) preserved.

Based on this assumption, the method of the present invention provides for computing a compressed version of each sensor fingerprint treated by the system S by means of random projections, i.e., by multiplying (matrix product) a compression matrix by a matrix that represents said sensor fingerprint (or vice versa), wherein said compression matrix has a number of rows (or columns) which is smaller than that of the matrix that represents the sensor fingerprint of a camera.

It must be taken into account that the image is a matrix and can be represented as a column vector obtained by reading the matrix of the image column by column; likewise, the (uncompressed) digital camera fingerprint extracted from the same image can also be represented as a column vector having the same dimensions as the image vector, i.e., the two corresponding column vectors have the same number of elements.

In combination with the above, the compression matrix may preferably be a random circulant matrix, in particular a random partial circulant matrix. The term "circulant" denotes a matrix the rows of which are circularly translated versions of the first row, i.e., a particular case of Toeplitz matrix. The term "partial" denotes that the number of rows of the sensing matrix is lower than the number of rows of the digital fingerprint, i.e., the compression matrix is a rectangular matrix with less rows than columns. The term "random" denotes that the first row of the sensing matrix comprises random variables generated in accordance with a chosen distribution (e.g., Gaussian random variables). This kind of matrix advantageously allows reducing the space occupied by said matrix and the complexity of the computation of a compressed fingerprint, since all rows of such a matrix contain the same values, and therefore said matrix can be generated by simply generating one row and then translating it circularly to obtain the other rows of said matrix. It is thus possible to increase the number of images whereon the device 1 can make a search per time unit, since this reduces the number of distinct parameters that need to be read by the processing and control means 11 in order to compress the sensor fingerprints (e.g., the search sensor fingerprint during the compression phase P2).

Furthermore, the use of the random circulant matrix allows obtaining the product between the uncompressed fingerprint and the random circulant matrix by using the Fast Fourier Transform (FFT), which advantageously allows reducing the number of multiplications that need to be carried out for compressing a fingerprint from $O(N^2)$ to $O(N \log(N))$, i.e., reducing the computational complexity of this operation. This will make for a greater number of images whereon the device 1 can make a search per time unit, because the speed at which fingerprints are compressed (both those in the memory means and the search sensor fingerprint) can be increased.

The man skilled in the art may also use other types of compression matrices, e.g., a completely random matrix comprising independent and identically distributed (i.i.d.) Gaussian random variables, or i.i.d. Rademacher random variables, or Bernoulli random variables, or even deterministic sensing matrices, without however departing from the teachings of the present invention.

In this embodiment of the invention, the device 1 is configured for computing, during the searching phase P3, an index of correlation between the compressed search sensor fingerprint and each one of the compressed fingerprints stored in the memory means 12,13 accessible to the device 1, by only selecting those images (or references to said images) for which the index of correlation has a value exceeding a threshold value.

This index of correlation is preferably determined on the basis of the Hamming distance, which in this particular case measures the number of bit substitutions necessary for converting the search sensor fingerprint into the fingerprint of the image with which said search sensor fingerprint is compared, or vice versa, i.e., it represents the number of bits that make the search sensor fingerprint different from the compressed fingerprint associated with one of the images.

It must be pointed out that the Hamming distance ($d_H$) between two fingerprints (a,b) having the same length (L) can be computed as follows:

$$d_H(a,b) = \Sum_{i=1}^{L} a_i \oplus b_i \quad (2)$$

As can be seen, the computation of the Hamming distance can be made by counting the number of bits having logical value 1 in the result of a bitwise exclusive OR (XOR) logic operation between two fingerprints. These operations can advantageously be made by the processing and control means 11 in a very efficient manner and without any floating-point operations, so that it will be possible to increase the number of images whereon the device 1 can conduct a search per time unit.

In order to improve the efficiency in time and space of the searching phase P3, the device 1 may also be configured for not searching for images in a single iteration (i.e., comparing the search sensor fingerprint with each one of the fingerprints stored in the memory means), but for making two or more iterations. More in detail, the device 1 may be configured for making, during a first iteration or anyway during any iteration preceding the last iteration, a comparison between a portion of the search fingerprint and a portion of each one of the fingerprints associated with the images, selecting those images (or references to said images) with are associated with the fingerprints having an index of correlation exceeding the threshold value, so that, in the course of the last iteration, a comparison will be made between the search fingerprint and the fingerprints associated with the images selected during the preceding iteration(s). In this manner, the number of comparison operations to be carried out can be reduced; in fact, when the Hamming distance is used as an index of correlation, it is possible to reduce the number of exclusive OR (XOR) operations that the processing means 11 must carry out in order to conduct a search, i.e., to compare the search fingerprint with the fingerprints associated with the images stored in the memory means, resulting in a higher number of fingerprints (and hence of images) whereon the device 1 will be able to make a search per time unit.

It must be pointed out that the size of the fingerprints compared during the last iteration is greater than that of the fingerprints compared during the previous phases. For this reason, two or more differently sized fingerprints may be associated with each image, and the search fingerprint must be compressed in such a way as to obtain two or more fingerprints the dimensions of which are compatible with those of the fingerprints associated with the images.

As an alternative to the above, a single fingerprint may always be associated with each image, while the smaller fingerprint (i.e., the one to be used during the iterations that precede the last one) is obtained on the basis of the bigger fingerprint (i.e., the one to be used during the last iteration). It can be stated, therefore, that the smaller fingerprint(s) is (are) embedded into the bigger fingerprint. This will reduce the complexity in space of a search, because it will no longer be necessary to store two or more fingerprints for each image contained in the memory means accessible to the device, but only a static index that will allow one to know which bits of the bigger fingerprint will have to be selected and/or read by the processing and/control means 11 in order to generate the smaller fingerprint; this will increase the number of images that can be stored, and therefore the number of images whereon the device 1 will be able to carry out a search.

In addition, efficiency in space can be improved by quantizing the value of the points of the fingerprints processed by the device 1, wherein the term quantization refers to converting the value of each point of a fingerprint into a predefined and limited set of values (e.g., 0 and 1 or a larger set). In this manner, it will be possible to store a larger number of image-associated fingerprints into the memory means accessible to the device 1, so that searches can be carried out on a larger quantity of images.

Of course, the embodiment described so far may be subject to many variations.

According to a first variant of the above-described embodiment, the device 1 is configured in such a way as to generate, instead of the above-described static index (which allows obtaining a smaller fingerprint starting from the bigger compressed fingerprint), an index on the basis of the position of characteristic points of the compressed search sensor fingerprint, i.e., points of said fingerprint which have values greater than a given threshold value or than the mean of the values of the points of said fingerprint; such points are also known as "outliers". Therefore, the smaller fingerprints can only be generated when the device 1 has generated the compressed version of the search sensor fingerprint contained in the request message, because only at that moment it will be possible to know the position of the outliers in said search sensor fingerprint. This approach limits the number of false negatives (fingerprints/images mistakenly discarded) that may occur during the first iteration (see the part of the description relating to the previous embodiment) in the event that parts of the fingerprints are not taken into account which contain significant information (e.g., one or more outliers), in that with this approach a comparison is made only between fingerprints points having values much above the noise threshold of the acquisition sensor and/or of the fingerprint extraction operations. In this manner, it will be possible to increase the number of images whereon the device 1 can make a search per time unit without detriment to the precision and recall of the method according to the invention.

As an alternative to or in combination with the above, it is also possible, for each image whereon the device 1 conducts a search, to load into the volatile memory means 12 the positions (coordinates) and, optionally, the values of the outliers of the compressed fingerprint associated with said image, i.e., loading into the volatile memory means 12 the characteristic points, i.e., those points which have values greater than a given threshold value or than the mean of the values of the other points of said fingerprint.

In this way, the processing and control means 11 can determine which images (or references thereto) have the outliers in the same positions and, optionally, with the same values, without requiring data to be loaded from the mass memory means 13, thus making for an increased number of images searched for by the device 1 per time unit.

Moreover, it is also possible to combine both of the above-described approaches, i.e., to configure the device 1 for loading the positions (coordinates) and, optionally, the values of the outliers of the compressed fingerprints associated with an image portion (e.g., the one having the highest probability of being selected) into the volatile memory means 12 and for determining the (smaller) fingerprints associated with the remaining image portion on the basis of the positions of the outliers in the search sensor fingerprint, i.e., loaded from the mass memory means 13 during the search. In this manner, it will be possible to advantageously increase the number of images whereon a search can be made per time unit, while also limiting the quantity of volatile memory necessary for conducting said search.

For improved efficiency in space, the information about the positions (coordinates) of the outliers loaded into the volatile memory means 12 can be coded with a lower (spatial) resolution than the resolution of the compressed fingerprints, so that information about a larger number of images can be loaded into the volatile memory means 12, the occupied space being equal. It will thus be possible to increase the number of images whereon the device 1 can conduct a search, the space in the volatile memory being equal, without detriment to the precision and recall of the method according to the invention.

In order to reduce even further the volatile memory space necessary for conducting a search (e.g., for increasing efficiency in space), the positions and, optionally, the values of the outliers may be compressed by using a suitable coding that will not impair the time performance of a search; the positions may, for example, be compressed by carrying out, preferably through the processing and control means 11, the following steps:
sorting the outlier positions in increasing order;
coding the first position by using the least possible number of bits;
coding the positions after the first one in a differential manner (e.g., by using the delta coding), i.e., by computing the difference between the second position and the first position, between the third position and the second position, and so on;
coding the position differences by using an Exponential-Golomb coding of k-th order.

In a third embodiment of the invention, which may anyway be combined with the two previously described embodiments, a plurality of compression matrices are used, as opposed to just one, so as to make it possible to make queries by using search sensor fingerprints having different resolutions. More in detail, the processing and control means 11 are configured for selecting, during the fingerprint compression phase P2, one or more compression matrices (which must be multiplied by or multiply the sensor fingerprint that needs to be compressed) from a plurality of matrices contained in a set of compression matrices on the basis of the resolution (i.e., the dimensions) of the sensor fingerprint that needs to be compressed. In this manner, it will advantageously be possible to conduct searches on images having different resolutions or to use sensor fingerprints having different resolutions, thereby increasing the number of images whereon a search can be carried out.

In combination with the above, the processing and control means 11 are configured for selecting, during the fingerprint compression phase P2, two or more compression matrices so sized that their (matrix) product, preferably between the first compression matrix selected, the sensor fingerprint and the second compression matrix selected, will generate a compressed sensor fingerprint having predefined and constant dimensions, i.e., so that the size of the compressed matrix will always be the same as the size of the fingerprint to be compressed changes. It will thus be possible to compare compressed fingerprints directly, without having to carry out any fingerprint rescaling operations, thereby reducing the computational load; in addition, by using fingerprints having a predefined size, it will also advantageously be possible to optimize the hardware (e.g., by creating or configuring dedicated high-performance processing means such as DSP, FPGA, CPLD or the like) of the device 1 and/or the software executed by said device 1 in order to carry out the fingerprint matching operations as quickly as possible, thus increasing the number of images whereon a search can be conducted.

In a fourth embodiment of the invention, which may however be combined with the first two embodiments as previously described, each one of the search sensor fingerprints and of the fingerprints associated with the images (or references thereto) accessible to the device 1 are generated, preferably by the device 1 and/or by the data acquisition device 3, as follows:
the fingerprint (either extracted from the device 3 or contained in a request message) is read and a given number of versions are generated, each one having a different resolution;
each version of the fingerprint is compressed by using a random projection technique, as previously described in regard to the other embodiments of the invention;
each version of the compressed fingerprint is converted into a vector (as previously described), and all vectors are concatenated together, thereby generating a single vector (for each original fingerprint) containing all of the different versions (at all the different resolutions) of the compressed fingerprint.

By generating the sensor fingerprints associated with the images (or with references thereto) in this way, it will advantageously be avoided that, in the course of a search, the device 1 may have to change the resolution of at least one of said fingerprints as a function of the resolution of the search fingerprint; in fact, this embodiment of the invention allows generating, during a search, a compressed fingerprint containing a plurality of fingerprints compressed at different resolutions for the search fingerprint alone. In this way, it will be possible to compare the search fingerprint thus generated, preferably by computing the Hamming distance, directly with the other fingerprints associated with the images (or references thereto) generated in a similar manner, without having to carry out any resolution conversions (upscaling or downscaling) in the course of the search, resulting in an increased number of images whereon the device 1 will be able to conduct a search per time unit.

In a fifth embodiment of the invention, which may however be combined with the two previously described embodiments, a search is conducted by a computing system comprising a plurality of devices 1 or by a device 1 equipped with processing means 11 comprising a plurality of CPUs and/or one or more CPUs comprising a plurality of cores, so as to increase the speed of execution of said search. To do so, each CPU and/or core and/or device 1 is configured for making a partial search (search sub-phase) on a sub-set of the images whereon the (full) search has to be conducted, and wherein said sub-set is preferably disconnected from the other sub-sets searched by the other CPUs and/or cores and/or devices 1. In this way, the computational load will be distributed among the different CPUs/cores/devices 1, because each partial search (search sub-phase) will be independent of the others, resulting in an increased number of images whereon a search can be conducted.

The present description has tackled some of the possible variants, but it will be apparent to the man skilled in the art that other embodiments may also be implemented, wherein some elements may be replaced with other technically equivalent elements. The present invention is not therefore limited to the explanatory examples described herein, but may be subject to many modifications, improvements or replacements of equivalent parts and elements without departing from the basic inventive idea, as set out in the following claims.

The invention claimed is:

1. A method for searching for images in memory means containing at least
    one or more images and/or references to said images, and, for each image and/or reference thereof, at least one sensor fingerprint associated with said image and/or with said reference, and related to the sensor that acquired said image,
    wherein said method comprises:
    a reading phase, wherein, through reading means, a search sensor fingerprint is read,
    a searching phase, wherein, through computing means, each one of the images and/or image references contained in the memory means is either selected or discarded on the basis of at least one comparison between at least one portion of the sensor fingerprint of one of the images and at least one portion of the search sensor fingerprint, and
    a compression phase, to be carried out prior to the searching phase, wherein the search sensor fingerprint and at least one of the sensor fingerprints associated with the images and/or with the references to said images are compressed, through the computing means, by using a random projection technique.

2. The method according to claim 1, wherein the search sensor fingerprint and each one of the sensor fingerprints associated with the images and/or with the references to said images are compressed by multiplying at least one compression matrix by each one of said fingerprints, or vice versa.

3. The method according to claim 2, wherein said at least one compression matrix is a partial circulant matrix.

4. The method according to claim 3, wherein the multiplication between said at least one compression matrix and at least one of the sensor fingerprints associated with the images and/or with the references to said images is carried out by using the fast Fourier transform.

5. The method according to claim 2, wherein said at least one compression matrix is selected from a set of compression matrices on the basis of the size of the fingerprint to be compressed.

6. The method according to claim 5, wherein two or more compression matrices are selected from the set of compression matrices on the basis of the size of the fingerprint to be compressed, and wherein the dimensions of said selected compression matrices are such that the product between said compression matrices and the fingerprint to be compressed will generate a compressed sensor fingerprint having a predefined size.

7. The method according to claim 1, wherein each sensor fingerprint is compressed, through the computing means, by concatenating a plurality of versions of said sensor fingerprint having different resolutions, and wherein each version of said fingerprint is compressed by using a random projection technique.

8. The method according to claim 1, wherein, during the searching phase, an index of correlation is computed, through the computing means, between the compressed search sensor fingerprint and each one of the compressed fingerprints associated with the images and/or with the references to said images, and wherein the images or the references to said images are either selected or discarded on the basis of the value of said index of correlation.

9. The method according to claim 8, wherein the index of correlation is computed on the basis of the Hamming distance between the compressed search sensor fingerprint and each one of the compressed fingerprints associated with the images and/or with the references to said images.

10. The method according to claim 8, wherein, during the searching phase, two or more search iterations are carried out through the computing means, wherein, during at least one of the iterations preceding the last iteration, an index of correlation is computed between at least one portion of the compressed search fingerprint and one portion of each one of the compressed fingerprints associated with the images and/or with the references to said images, and a set of images or references to said images is selected on the basis of the indices of correlation, and wherein, during the last iteration, a comparison is made between the search fingerprint and each one of the fingerprints associated with the images and/or with the references to said images included in said set of images.

11. The method according to claim 10, wherein the portions of each one of the compressed fingerprints associated with the images and/or with the references to said images which are compared with the compressed search sensor fingerprint during at least one of the iterations preceding the last iteration are determined on the basis of the position of characteristic points of the compressed search sensor fingerprint, wherein the characteristic points are points of a compressed fingerprint having values greater than a certain threshold value or greater than the mean value of the points of said fingerprint.

12. The method according to claim 11, also comprising a memory loading phase, which is carried out prior to the searching phase, wherein search information comprising the position of the characteristic points of the sensor fingerprints associated with the images and/or with the references to said images is loaded into volatile memory means.

13. The method according to claim 12, wherein the positions comprised in the search information are coded with a resolution which is lower than the resolution of the compressed fingerprints associated with the images and/or with the references to said images.

14. The method according to claim 12, wherein the positions comprised in the search information are coded in a differential manner by using an Exponential-Golomb coding of the k-th order.

15. The method according to claim 1, wherein the searching phase comprises a plurality of searching sub-phases, wherein each one of said sub-phases can be carried out, through the computing means, independently of the other ones, and wherein each one of said sub-phases is carried out on a sub-set of the images contained in the memory means.

16. The method according to claim 15, wherein each sub-set of the images contained in the memory means, on which a searching sub-phase is carried out, is disconnected from the other sub-sets.

17. The method according to claim 1, wherein, during the compression phase, the value of each one of the points of the compressed fingerprints is converted, through the computing means, into a value comprised within a limited set of values.

18. A computer program product which can be loaded into the memory of an electronic computer, and which comprises portions of software code for executing the phases of the image searching method according to claim 1.

19. A device for searching for images, comprising
input/output means adapted to gain access to mass memory means containing at least:
one or more images and/or references to said images, and,
for each image and/or reference thereof, at least one sensor fingerprint associated with said image and/or with said reference, and related to the sensor that acquired said image,
reading means configured for reading a search sensor fingerprint,
volatile memory means, into which at least a part of said sensor fingerprints can be loaded, and
computing means in signal communication with the memory means and the reading means, wherein said computing means are configured for carrying out a search among the images and/or the references to said images, wherein each one of the images and/or references to said images contained in the memory means is either selected or discarded on the basis of at least one comparison between at least one portion of the sensor fingerprint of said image and at least one portion of the search sensor fingerprint,
wherein the computing means are also configured for compressing, prior to making the search, the search sensor fingerprint and at least one of the sensor fingerprints associated with the images and/or with the references to said images by using a random projection technique.

20. The device according to claim 19, wherein the search sensor fingerprint and each one of the sensor fingerprints associated with the images and/or with the references to said images are compressed by multiplying at least one compression matrix by each one of said fingerprints, or vice versa.

21. The device according to claim 20, wherein said at least one compression matrix is a partial circulant matrix.

22. The device according to claim 21, wherein the computing means are also configured for executing the fast Fourier transform in order to multiply said at least one compression matrix by at least one of the sensor fingerprints associated with the images and/or with the references to said images.

23. The device according to claim 19, wherein the computing means are also configured for selecting said at least one compression matrix from a set of compression matrices on the basis of the size of the fingerprint to be compressed.

24. The device according to claim 23, wherein the computing means are also configured for selecting two or more compression matrices from the set of compression matrices on the basis of the size of the fingerprint to be compressed, and wherein the dimensions of said selected compression matrices are such that the product between said compression matrices and the fingerprint to be compressed will generate a compressed sensor fingerprint having a predefined size.

25. The device according to claim 19, wherein the computing means are also configured for compressing each sensor fingerprint by concatenating a plurality of versions of said fingerprint having different resolutions, and wherein each version of said fingerprint is compressed by the computing means by using a random projection technique.

26. The device according to claim 19, wherein the computing means are also configured for computing, during the search, an index of correlation between the compressed search sensor fingerprint and each one of the compressed fingerprints associated with the images and/or with the references to said images, and wherein the computing means are also configured for either selecting or discarding said image and/or reference to said image on the basis of the value of said index of correlation.

27. The device according to claim 26, wherein the computing means compute the index of correlation on the basis of the Hamming distance between the compressed search sensor fingerprint and each one of the compressed fingerprints associated with the images and/or with the references to said images.

28. The device according to claim 26, wherein the computing means are also configured for executing, during the search, two or more search iterations, wherein, during at least one of the iterations preceding the last iteration, said computing means compute an index of correlation between at least one portion of the compressed search fingerprint and one portion of each one of the compressed fingerprints associated with the images and/or with the references to said images, and select a set of images or references to said images on the basis of the indices of correlation, and wherein, during the last iteration, said computing means make a comparison between the search fingerprint and each one of the fingerprints associated with the images and/or with the references to said images included in said set of images.

29. The device according to claim 28, wherein the computing means are also configured for determining the portions of each one of the compressed fingerprints associated with the images and/or with the references to said images, which are compared with the compressed search sensor fingerprint during at least one of the iterations preceding the last iteration, on the basis of the position of characteristic points of the compressed search sensor fingerprint, wherein the characteristic points are points of a compressed fingerprint having values greater than a certain threshold value or greater than the mean value of the points of said fingerprint.

30. The device according to claim 29, wherein the computing means are also configured for loading into the volatile memory means, prior to the search, search information comprising the position of the characteristic points of the sensor fingerprints associated with the images and/or with the references to said images.

31. The device according to claim 30, wherein the computing means are also configured for coding the positions comprised in the search information with a resolution which is lower than the resolution of the compressed fingerprints associated with the images and/or with the references to said images.

32. The device according to claim 30, wherein the computing means are also configured for coding the positions comprised in the search information in a differential manner by using an Exponential-Golomb coding of the k-th order.

33. The device according to claim 19, wherein the computing means are also configured for converting the values of each one of the points of the compressed fingerprints into a value comprised within a limited set of values.

34. A computing system comprising a plurality of devices according to claim 19, wherein each one of the devices is configured for executing a search portion, wherein each portion can be executed independently of the other ones, and wherein each one of said search portions is executed on a sub-set of the images contained in the mass memory means.

35. The computing system according to claim 34, wherein each sub-set of the images contained in the memory means, on which a search portion is carried out, is disconnected from the other sub-sets.

* * * * *